US012005500B2

(12) United States Patent
Cavalcabo et al.

(10) Patent No.: US 12,005,500 B2
(45) Date of Patent: Jun. 11, 2024

(54) DETERMINING A POSITION OF A BUILDING PLATFORM WITHIN A PROCESS CHAMBER OF AN ADDITIVE MANUFACTURING DEVICE

(71) Applicant: TRUMPF SISMA s.r.l, Schio (IT)

(72) Inventors: Guglielmo Cavalcabo, Milan (IT); Elia Mantoan, Valli del Pasubio (IT); Mattia Boron, Este (IT)

(73) Assignee: TRUMPF ADDITIVE MANUFACTURING ITALIA S.R.L., Schio (IT)

( * ) Notice: Subject to any disclaimer, the term of this patent is extended or adjusted under 35 U.S.C. 154(b) by 352 days.

(21) Appl. No.: 17/469,909

(22) Filed: Sep. 9, 2021

(65) Prior Publication Data
US 2022/0088682 A1 Mar. 24, 2022

(30) Foreign Application Priority Data
Sep. 18, 2020 (EP) .................................... 20196956

(51) Int. Cl.
*B22F 10/31* (2021.01)
*B22F 10/28* (2021.01)
(Continued)

(52) U.S. Cl.
CPC .............. *B22F 10/31* (2021.01); *B22F 10/28* (2021.01); *B22F 10/85* (2021.01); *B22F 12/30* (2021.01);
(Continued)

(58) Field of Classification Search
CPC .......... B22F 10/31; B22F 10/28; B22F 10/85; B22F 10/80; B22F 12/30; B22F 12/41;
(Continued)

(56) References Cited

U.S. PATENT DOCUMENTS

2010/0176539 A1 7/2010 Higashi et al.
2016/0082668 A1 3/2016 Perret et al.
(Continued)

FOREIGN PATENT DOCUMENTS

DE 102013208651 A1 11/2014
DE 112008000030 B4 7/2015
(Continued)

*Primary Examiner* — Moshe Wilensky
(74) *Attorney, Agent, or Firm* — LEYDIG VOIT & MAYER LTD.X

(57) ABSTRACT

A method determines position data of a platform at a plate of an additive manufacturing device, having scanner optics for scanning a laser. The plate has holes that receive a holder, marks on the plate, and receptors for receiving laser target parts. A first position dataset is obtained with a position of a holder inserted in a hole with respect to the marks. After mounting the plate and inserting the platform into the holder, a laser mark is marked on the laser target parts using the laser at laser mark positions in the scanner optics' coordinate system. A pre-manufacturing image of the support plate is acquired with the laser marks on the laser target parts. A second position dataset having positions of the marks with respect to the laser marks is obtained from the pre-manufacturing image. The position data is determined from the position datasets and the laser mark positions.

11 Claims, 4 Drawing Sheets

(51) Int. Cl.
  *B22F 10/85* (2021.01)
  *B22F 12/30* (2021.01)
  *B22F 12/41* (2021.01)
  *B22F 12/49* (2021.01)
  *B22F 12/90* (2021.01)
  *B33Y 50/02* (2015.01)
  *B33Y 10/00* (2015.01)
  *B33Y 30/00* (2015.01)

(52) U.S. Cl.
  CPC .............. *B22F 12/41* (2021.01); *B22F 12/49* (2021.01); *B22F 12/90* (2021.01); *B33Y 50/02* (2014.12); *B33Y 10/00* (2014.12); *B33Y 30/00* (2014.12)

(58) Field of Classification Search
  CPC .......... B22F 12/49; B22F 12/90; B33Y 50/02; B33Y 10/00; B33Y 30/00; B33Y 50/00; B33Y 80/00; A61C 5/77; A61C 8/005; A61C 13/0013; B23K 26/032; B23K 26/042; B23K 26/0622; B23K 26/082; B23K 26/342; B29C 64/153; B29C 64/245; B29C 64/386; G05B 2219/37067; G05B 2219/37572; G05B 2219/49007; G05B 2219/49013; G01B 11/002
  See application file for complete search history.

(56) References Cited

U.S. PATENT DOCUMENTS

| | | |
|---|---|---|
| 2018/0347969 A1 | 12/2018 | Snelling, Jr. et al. |
| 2019/0210289 A1 | 7/2019 | Frantzdale et al. |
| 2021/0023622 A1 | 1/2021 | Pieger et al. |

FOREIGN PATENT DOCUMENTS

| | | |
|---|---|---|
| DE | 102018112246 A1 | 12/2018 |
| DE | 102018205403 A1 | 10/2019 |
| EP | 3695954 A1 | 8/2020 |
| WO | WO 2015040185 A1 | 3/2015 |
| WO | WO 2017158327 A1 | 9/2017 |
| WO | WO 2019052671 A1 | 3/2019 |

DETERMINING A POSITION OF A BUILDING PLATFORM WITHIN A PROCESS CHAMBER OF AN ADDITIVE MANUFACTURING DEVICE

CROSS REFERENCE TO RELATED APPLICATIONS

This application claims benefit to European Patent Application No. EP 20196956.5 filed on Sep. 18, 2020, which is hereby incorporated by reference herein.

FIELD

The present disclosure relates generally to a method for determining a position data of a building platform insert mounted to a support plate within a process chamber of an additive manufacturing device. Moreover, the present disclosure relates generally to an additive manufacturing device, a support plate and a system configured to be used for the method.

BACKGROUND

Additive manufacturing devices are generally used for the production of three-dimensional components by directing a laser beam with a scanner optics on a layer of a powder material, which typically forms a working surface in the process chamber of the additive manufacturing device. The laser beam melts or sinters the powder material locally to produce a three-dimensional component layer by layer.

For particular applications, it might be advantageous if a three-dimensional component is not exclusively made of the powder material, but only an upper part of the component is produced by building up melted (or sintered) powder layers on a prefabricated lower part, which is herein referred to as a building platform and is also known as a preform.

In order to provide for a correct alignment and a strong bonding between the additive manufactured upper part and the prefabricated lower part of the component, the prefabricated lower component should be irradiated exactly with the laser beam. The quality of the resulting three-dimensional component is directly related to the geometrical accuracy of the positioning of the upper part on the prefabricated lower part, i.e. the building platform. For special applications, e.g., for dental applications, requirements for the accuracy may be in the range of about +/−50 µm.

DE 11 2018 205 403 A1 discloses a method for calibrating an additive manufacturing device to enable a precise connection of a three-dimensional component built up in layers to a prefabricated lower part.

SUMMARY

In an embodiment, the present disclosure provides a method that determines a position data of a building platform provided at a support plate within a process chamber of an additive manufacturing device. The additive manufacturing device has scanner optics for scanning a laser beam across a working plane over a powder bed for additive manufacturing of a workpiece. The position data of the building platform relates to a coordinate system of the scanner optics. The support plate has: a plurality of building platform holes configured to respectively receive at least one building platform holder for holding the building platform, a plurality of optically detectable reference marks distributed on a surface of the support plate in reference to the building platform holes, and at least two receptors configured to receive respectively one of laser target parts. The method includes: obtaining a first position dataset comprising a precision position of the at least one building platform holder inserted in one of the plurality of building platform holes with respect to the reference marks; upon the support plate being mounted in the process chamber and the building platform is inserted into the at least one building platform holder, marking a laser mark on the laser target parts provided in the receptors using the laser beam and the scanner optics, wherein the laser marks are marked in the working plane at respective laser mark positions defined in the coordinate system of the scanner optics; acquiring a pre-manufacturing image of the support plate that has the laser marks on the laser target parts and is mounted within the process chamber; obtaining from the pre-manufacturing image a second position dataset comprising positions of the reference marks with respect to the laser marks; and determining the position data of the building platform within the coordinate system of the scanner optics from the first position dataset, the second position dataset, and the laser mark positions.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
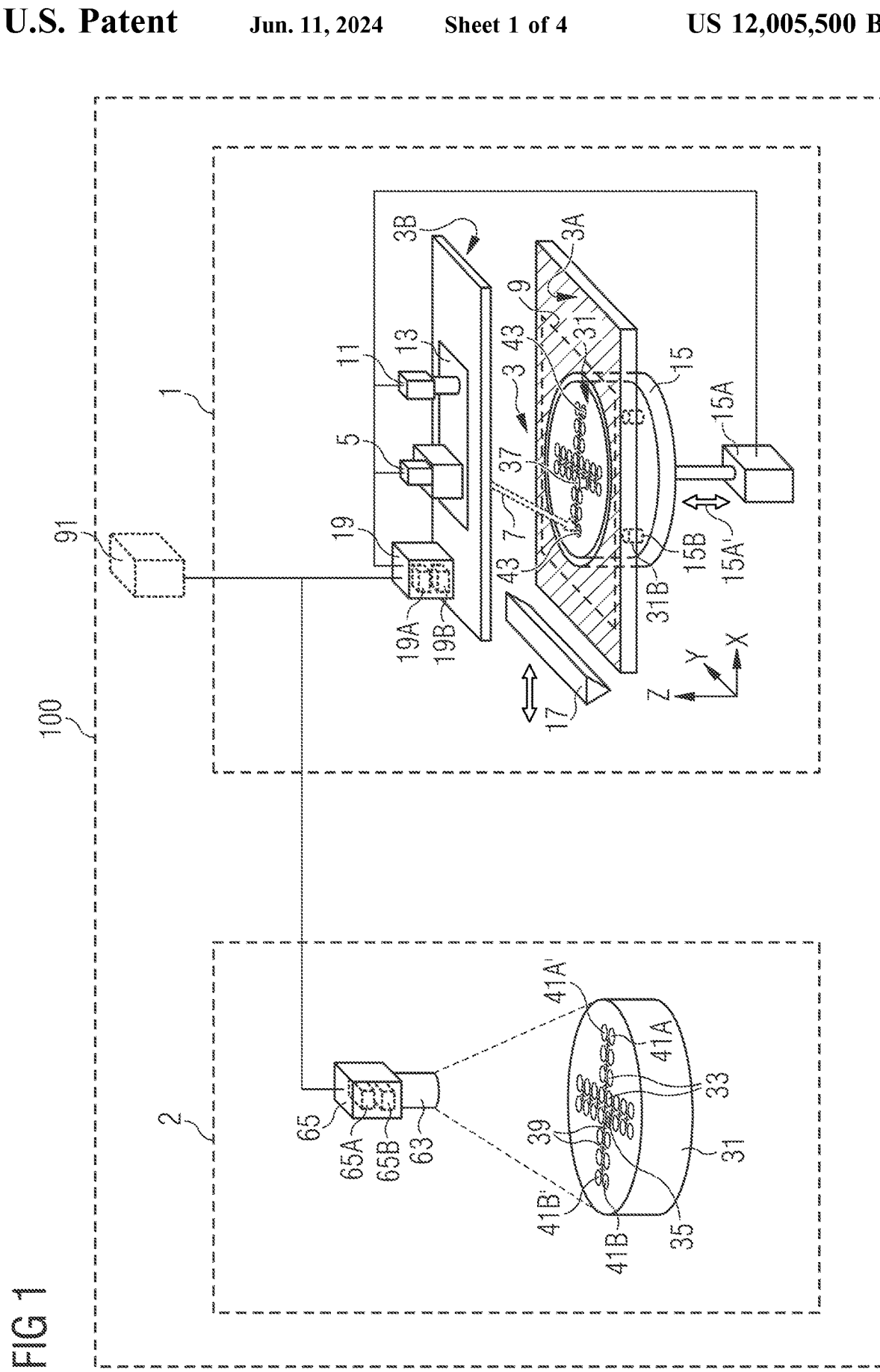
FIG. 1 is a schematic overview of a system with an additive manufacturing device and a vision measuring device.

Embodiments of the present disclosure provide an image data-based alignment procedure of the laser with respect to a building platform insert/building platform. The method is easily performed, preferably in an automated manner, and in particular is implementable also in existing additive manufacturing devices.

Thus, aspects of the present disclosure are directed, at least in part, to improving or overcoming one or more aspects of prior systems, and in particular to provide an efficient and scalable approach for aligning coordinate systems associated to respective irradiation beams in a multi-beam additive manufacturing device with respect to a building platform insert/building platform.

In a first aspect, the present disclosure provides a method for determining a position data of a building platform provided at a support plate within a process chamber of an additive manufacturing device. The additive manufacturing device includes scanner optics for scanning a laser beam across a working plane over a powder bed for additive manufacturing of a workpiece. The position data of the building platform relates to a coordinate system of the scanner optics. The support plate includes a plurality of building platform holes configured to respectively receive a building platform holder for holding a building platform, a plurality of optically detectable reference marks distributed on a surface of the support plate in reference to the building platform holes, and at least two receptors configured to receive respectively a laser target part.

The method comprises the steps of:
- obtaining a first position dataset including a precision position of at least one building platform holder inserted in one of the plurality of building platform holes with respect to the reference marks;
- when the support plate is mounted in the process chamber and the building platform is inserted into the at least one building platform holder (e.g., in a predefined position in relation to the at least one building platform holder), marking a laser mark on the laser target parts provided in the receptors using the laser beam and the scanner optics, wherein the laser marks are marked in the working plane at respective laser mark positions defined in the coordinate system of the scanner optics;
- acquiring a pre-manufacturing image of the support plate that has the laser marks on the laser target parts and is mounted within the process chamber;
- obtaining from the pre-manufacturing image a second position dataset including positions of the reference marks with respect to the laser marks; and
- determining the position data of the building platform within the coordinate system of the scanner optics from the first position dataset, the second position dataset, and the laser mark positions.

In another aspect, the present disclosure provides a support plate, that is in particular configured to be used in the above method. The support plate comprises:
- a plurality of building platform holes configured to respectively receive a building platform holder for holding a building platform;
- a plurality of optically detectable reference marks arranged in a grid arrangement and distributed on a surface of the support plate in reference to the building platform holes; and
- at least one pair of receptors, each configured to receive a laser target part.

In another aspect, the present disclosure provides an additive manufacturing device for additive manufacturing a workpiece from powdered material. The additive manufacturing device comprises:
- a process chamber with a working plane;
- a scanner optics for scanning a laser beam across the working plane;
- a monitoring camera configured to take an image of at least a part of the process chamber;
- a controller with at least one microprocessor and at least one storage device storing instructions that are operable, when executed by the at least one microprocessor, to cause the controller to receive image data from the monitoring camera, and control the scanner optics; and
- a support plate (in particular as described above) that mountable in the process chamber.

Thereby, the additive manufacturing device is configured for when the support plate is mounted in the process chamber and a building platform is inserted into the at least one building platform holder (in a predefined position in relation to the building platform holder), marking a laser mark on the laser target parts provided in the receptors using the laser beam and the scanner optics, wherein the laser marks are marked at respective laser mark positions defined in the coordinate system of the scanner optics. Furthermore, the monitoring camera is configured for acquiring a pre-manufacturing image of the support plate that has the laser marks on the laser target parts and is mounted within the process chamber.

The controller may be configured for:
- obtaining a first position dataset including a precision position of at least one building platform holder inserted in one of the plurality of building platform holes with respect to the reference marks;
- obtaining from the pre-manufacturing image a second position dataset including positions of the reference marks with respect to the laser marks, and
- determining the position data of the building platform within the coordinate system of the scanner optics from the first position dataset, the second position dataset, and the laser mark positions.

In another aspect, the present disclosure provides a system comprising:
- an additive manufacturing device, in particular as described above;
- a support plate, in particular as described above; and
- a vision measuring device configured to acquire a precision image of the support plate with at least one building platform holder inserted in one of a plurality of building platform holes.

In some embodiments, the obtaining of the first position dataset may include taking a precision image of the support plate with the at least one building platform holder inserted in one of the plurality of building platform holes, and/or receiving a precision image of the support plate with the at least one building platform holder inserted in one of the plurality of building platform holes.

In some embodiments, the precision image may be taken with a vision measuring device and the precision position of the at least one building platform holder inserted in one of the plurality of building platform holes with respect to the reference marks can be measured with an accuracy of 5 μm and less, preferably 3 μm and less, more preferably 0.5 μm and less. The vision measuring device could be for example a CNC (computerized numerical control) vision measuring machine such as the CNC vision measuring machine QuickVision Apex QVT1-x404P1L-D by Mitutoyo.

In some embodiments, the marking of the laser marks on the laser target parts can include:
- arranging the support plate on a movable piston of the additive manufacturing device;
- positioning the piston to align a surface of the laser target parts with the working plane; and
- irradiating the laser beam onto the laser target parts.

In some embodiments, the determining of the position data of the building platform within the coordinate system of the scanner optics can include:
- based on the first position dataset and the second position dataset, creating a consolidated position dataset including a position of the at least one building platform holder (and optionally positions of the reference marks) with respect to the laser marks; and
- deriving the position data of the building platform within the coordinate system of the scanner optics from the consolidated position dataset and the laser mark positions (assuming that the building platform is inserted in the at least one building platform holder in a predefined position in relation to the at least one building platform holder).

In some embodiments, the consolidated position dataset may be created by mapping the first position dataset and the second position dataset based on the positions given for the reference marks in each of the first position dataset and the second position dataset, and optionally may include applying a non-linear distortion correction using the positions of the reference marks, in particular using computations based on neural networks, thin plate splines, or radial basis functions.

In some embodiments, the laser marks can be marked in cross-shaped and/or the reference marks are cross-shaped.

In some other embodiments, the method may further include providing of the laser mark positions defined in the coordinate system of the scanner optics, by:
- targeting the laser target parts with a guiding laser beam; and/or
- arranging the support plate on the piston in a predefined position, particularly by engaging a mounting structure of the support plate with a corresponding mounting receiver of the piston.

The guiding laser beam can be the laser beam which is used for marking the laser marks.

In some embodiments, the pre-manufacturing image of the mounted support plate may be taken by a monitoring camera of the additive manufacturing device.

In some embodiments, the receptors of the at least one pair of receptors can be arranged spaced apart at opposite sides of the grid arrangement, and/or the surface of the support plate may have undergone a mechanical surface treatment, in particular a sandblasting surface treatment. By sandblasting the surface of the support plate (before the reference marks are provided at the support plate), it can be possible to increase the contrast between the reference marks and the surface of the support plate which surrounds the reference marks. This can facilitate the recognition of the reference marks and improve the accuracy of the measurement.

In some embodiments of the system, the vision measuring device may include a precision camera configured to take the precision image outside of the process chamber of the additive manufacturing device and in particular to measure a precision position of the at least one building platform holder inserted in one of the plurality of building platform holes with respect to reference marks with an accuracy of 5 µm and less, such as 3 µm and less.

In some embodiments, the additive manufacturing device or the vision measuring device may further include a vision controller with at least one microprocessor and at least one storage device storing instructions that are operable, when executed by the at least one microprocessor, to cause the vision controller to
- receive image data of the precision image taken by the precision camera;
- derive a first position dataset including the precision position of the at least one building platform holder inserted in the one of the plurality of building platform holes with respect to the reference marks; and
- send the first position dataset to the controller.

Other features and aspects of this disclosure will be apparent from the following description and the accompanying drawings.

The following is a detailed description of exemplary embodiments of the present disclosure. The exemplary embodiments described herein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the inventor's realization that the position of a building platform within the coordinate system of an additive manufacturing device, specifically of a laser scanner, is crucial for correct manufacturing of high precision products such as dental products (crowns, bridges, etc.). However, the building platform is fixed to a portable support plate which is prepared external to the additive manufacturing device before it is mounted in a process chamber of the additive manufacturing device. The inventors realized that proper position information is possible and can be determined fast, easy, and with an increased accuracy, such as with an accuracy better than 50 µm, by combining high precision position data, which is gathered outside of the additive manufacturing device, with position data that is gathered inside the additive manufacturing device and links the high precision position data to the laser scanner.

The inventors have therefore provided a multiple step approach, which can include the following steps:
- a) taking a high-resolution precision image of the support plate, in particular outside the additive manufacturing device by a vision measuring device (providing high precision image information of the support plate);
- b) marking (exchangeable) laser target parts fixed to the support plate with laser marks at laser mark positions defined in the coordinate system of the additive manufacturing device, e.g., after the support plate was installed in the process chamber;
- c) taking a pre-fabrication image of the support plate mounted within the process chamber with a monitoring camera of the additive manufacturing device; and
- d) combining position information from the high-resolution precision image, the pre-fabrication image, and the laser mark positions defined within the coordinate system of an additive manufacturing device (specifically the laser scanner optics) to derive the position of the building platform within the coordinate system of the additive manufacturing device.

In another aspect, the disclosure is based on the inventor's realization that the derivation of the position of the building platform can be achieved in a particularly efficient, economic, and sustainable way by using a support plate that is configured for multi-use and that is intended to receive different types of building platforms. For example, the support plate may have building platform holes, which can receive different types of building platform holders. In addition, the support plate has receptors defined in shape to receive laser target parts, the laser target parts configured and installed to be laser marked with the laser beam used for additive manufacturing.

Figure 5:
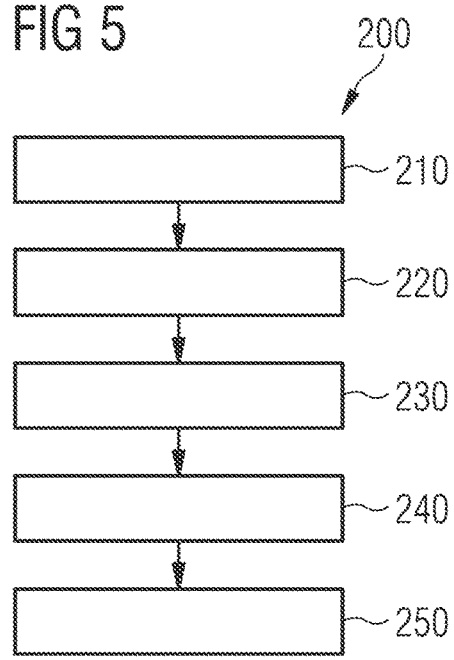
FIG. 5 is a flow chart illustrating an exemplary method for determining a position data of a building platform.
Figure 6:
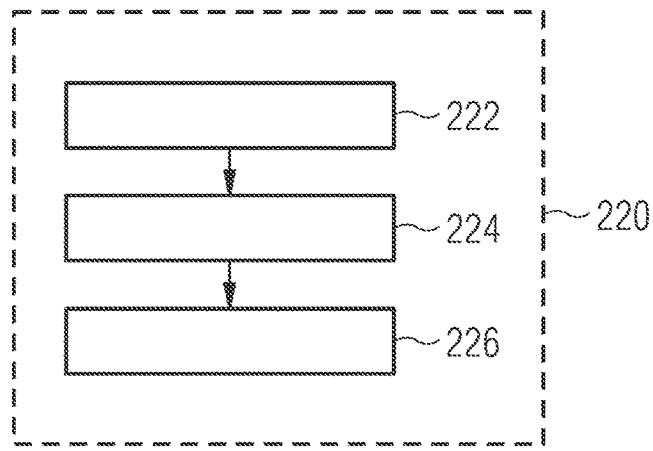
FIG. 6 is a flow chart illustrating a procedure for obtaining a first position dataset.
Figure 7:
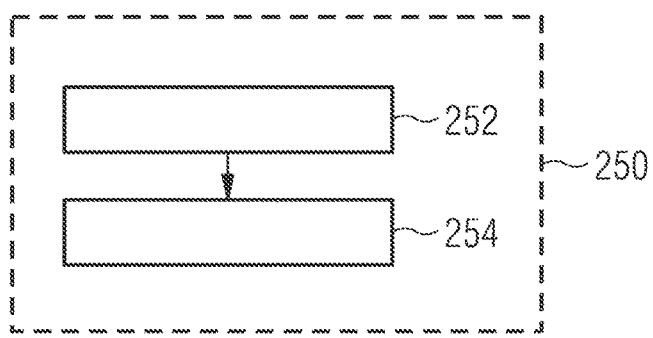
FIG. 7 is a flow chart illustrating a procedure for determining a position data of the building platform.

Inventive concepts will be explained based on an exemplary embodiment of a system with an additive manufacturing device and a vision measuring device such as a CNC vision measuring machine as shown in FIG. 1, as well as exemplary illustrations of support plates used in the additive manufacturing device as shown in FIG. 2 to FIG. 4C. FIG. 5 illustrates the herein disclosed concepts for determining a position data of a building platform in a flow chart, and FIG. 6 and FIG. 7 provide further details thereon.

Referring to FIG. 1, a system 100 according to FIG. 1 includes an additive manufacturing device 1 and the vision measuring device 2.

The additive manufacturing device 1 is configured for additive manufacturing of a workpiece from powdered material and includes a processing chamber 3 with a bottom 3A and an upper ceiling 3B, a scanner optics 5 for scanning a laser beam 7 across a working plane 9 defined at the bottom 3A, and a monitoring camera 11 for imaging the working plane at least partly, an optical window 13 as part of the upper ceiling 3B. In the area of the powdered material, the plane bottom 3A has a cut-out for a piston 15.

The piston 15 may be circular with a plane surface that can be lowered for a layer by layer production of a workpiece. A piston actuator 15A can move the piston 15 perpendicular to the working plane 9 along a piston axis 15B.

Moreover, a depositing device 17 is provided within the process chamber 3 to distribute powdered material during the additive manufacturing process. In the upper ceiling 3B, an optical window 13 is provided which transmits the laser beam 7 and optional light in the visual and/or the infrared spectrum.

For example, the scanner optics 5 and optionally the monitoring camera 11 are arranged on an outer side of the optical window 13 facing away from the process chamber 3. The scanner optics 5 is configured to irradiate and move (scan) the laser beam 7 across the working plane 9 within a coordinate system X, Y, Z of the scanner optics 5 in order to melt/sinter the powder material along a predefined scan trajectory. In addition to processing the powdered material, the laser beam 7 can be used for marking a markable surface with a laser mark, e.g., caused by partial melting/burning/evaporating of material.

The scanner optics 5, the monitoring camera 11, and the piston actuator 15 are connected to and configured to be controlled by a controller 19 of the additive manufacturing device 1. The controller 19 includes a microprocessor 19A and a storage device 19B. The storage device 19B stores operable instructions, which cause when executed by the microprocessor 19A the controller 19 to control the scanner optics 5 (and thereby the scanning of the laser beam 7) and the piston actuator 15 (and thus the height of the piston 15). Furthermore, the controller 19 can be caused to make the monitoring camera 11 acquiring an image of working plane within the process chamber 3, to receive respective image data from the monitoring camera 11. In addition, the controller 19 can be caused to obtain a position dataset, to determine/derive the position of objects, and/or to receive image data or position data/data sets from an external storage device 91 and/or the vision measuring device 2.

Vision measuring devices are well known to a person skilled in the art and are generally used for precisely measuring objects, such as surface features in particular their dimensions, based on a visual image. Herein, the vision measuring device 2 is configured to take a precision image of an object, in the present case a precision image of (a top surface of) a support plate 37 and deriving a position dataset including precision positions of certain structures/structural features of the object. The vision measuring device 2 includes, for example, a precision camera 63 and a vision controller 65. The precision camera 63 is configured to take the precision image. The precision image may resolve the surface of the support plate 31 with a high resolution (higher than the resolution of the monitoring camera 11, e.g., resolution by factor of 10). For example, each pixel of the precision image has a pixel extension of approx. 10 µm and represents an area of the surface of the support plate of approx. 10 µm×10 µm (pixel resolution). Using an image analysis algorithm on the precision image, the positions of the (cross-shaped) reference marks as well as the position of the building platform holder can be determined with an increased accuracy that goes beyond the pixel resolution, e.g., deriving a final resolution of approx. 1/10 of the of the pixel extension. For example, an accuracy of 1 µm to 3 µm (final resolution) can be achieved, e.g., by also considering information concerning a (known) shape of an individual reference mark/building platform holder, a (known) arrangement, or (known) distances between the reference marks within the image analysis algorithm. In this manner, a precision position Ph of the at least one building platform holder 35 inserted in one of the plurality of building platform holes 33 can be measured with respect to the reference marks 9 with an accuracy of, e.g., 5 µm or less, such as 3 µm and less, e.g., 1.5 µm or less, preferably 0.5 µm and less (e.g., based on the precision image, an accuracy range from, e.g., 5 µm to 0.1 µm, or 3 µm to 0.5 µm is possible). The vision controller 65 includes, for example, a microprocessor 65A and a storage device 65B for executing and storing operable instructions, respectively. When the instructions are executed by the microprocessor 65A, the vision controller 65 is caused to make the precision camera 63 to acquire a precision image, to receive image data from the precision camera 63, to derive/determine a precision position of a structure associated to an imaged object in the precision image, to obtain a position dataset, and to make image data and/or position data/datasets available to the controller 19 of the additive manufacturing device 1.

In particular for manufacturing small workpieces, the additive manufacturing device 1 may be used in connection with a support plate 31 positioned on the piston 15 such that a powder bed is formed on top of the support plate 31 instead of the piston surface, for example. The support plate 31 may comprise a plurality of building platform holes 33 opening into an (upper) surface 31A of the support plate 31. Further structural details of the support plate are discussed in connection with FIGS. 2 and 3. Referring to FIG. 3, the building platform holes 33 can be used, e.g., via building platform holders 35, to provide a suitable mount for respective building platforms 37 on which individual small workpieces are manufactured layer by layer.

While in the figures, cross-like arrangements of building platform holes 33 are schematically indicated, any type of arrangement, in particular using as much as possible of the accessible area of the surface 31A of the support plate 31, can be implemented. Furthermore, the grid-like arrangement of the building platform holes 33 is also exemplarily and any type of relative location may be implemented. Similarly, while in the figures, arrangements of identical building platform holes 33 are illustrated, different types of building platform holes 33 having, for example, different geometries (cross-sections) may be provided in the support plate 31.

In line with the method for determining a position data of a specific one of one or more building platforms 37 mounted in the support plate 31, the support plate 31 is also shown in FIG. 1 to be imaged by the vision measuring device 2 prior being mounted in the process chamber 3 for use in the additive manufacturing device 1.

Figure 2:
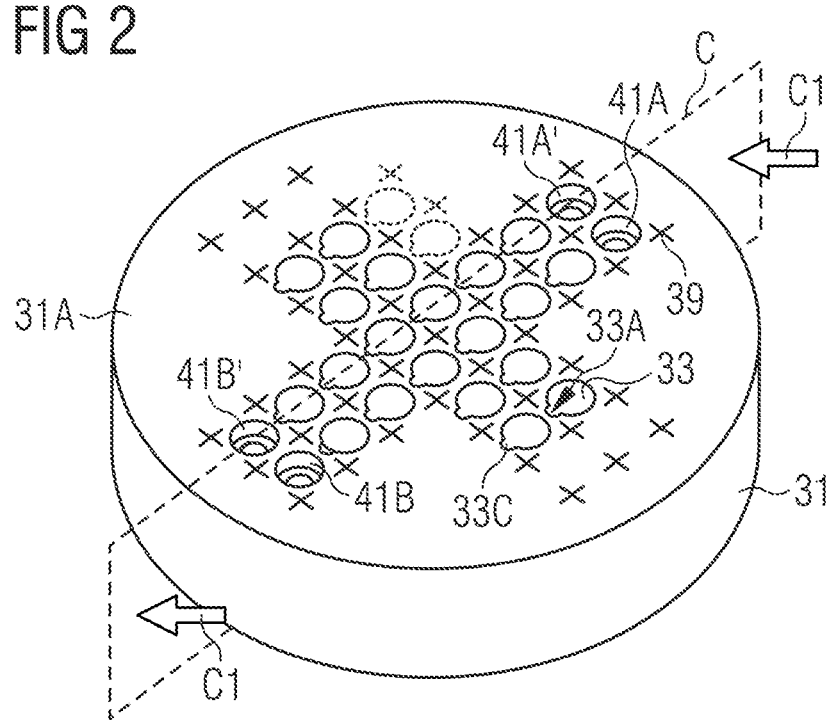
FIG. 2 is a schematic perspective view of an exemplary support plate.
Figure 3:
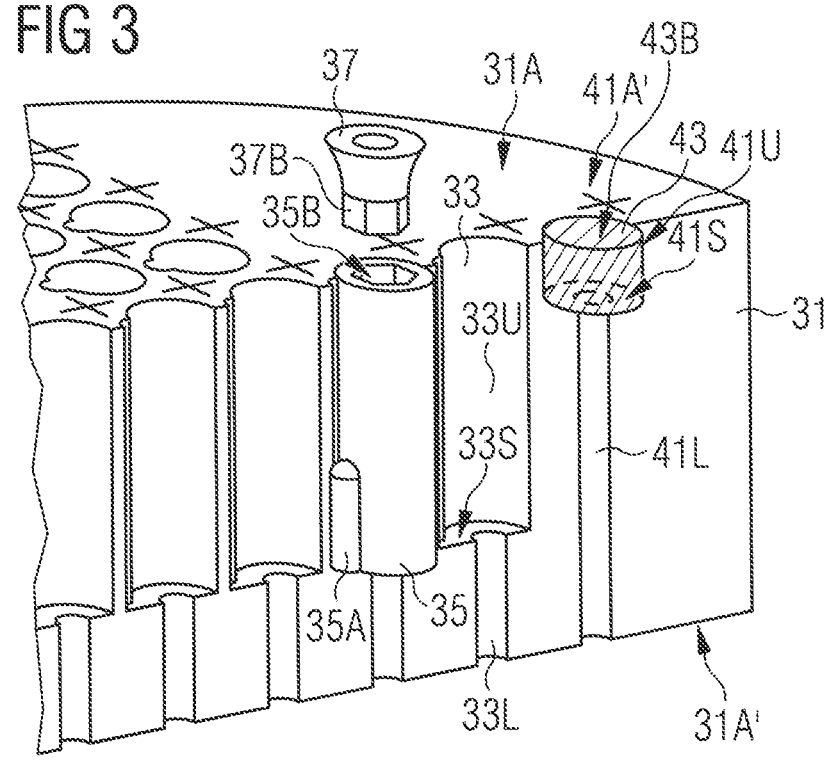
FIG. 3 is a schematic perspective cut-view of a portion of the support plate of FIG. 2.

FIG. 2 shows a schematic perspective view of the support plate 31 with a cross-shaped arrangement of exemplary two rows of building platform holes 33 in orthogonal directions. Two building platform holes 33 are shown as dotted lines to illustrate the extendibility and flexibility of the arrangement and, thus, the positions of the building platform holes 33 on the surface 31A of the support plate 31. The support plate 31 is of cylindrical shape and includes, in addition to the building platform holes 33 cross-shaped reference marks 39. The reference marks 39 are provided on the surface 31A of the support plate 31, e.g., as an interleaved arrangement of rows and columns that form a grid such that the reference marks and openings of the platform holes are distributed next to each other. The reference marks 39 are configured to be visually detectable, e.g., with the vision measuring device 2, at a high precision in their positions on the surface 31A of the support plate 31.

As further shown in FIG. 2, there are formed two pairs of receptors 41A, 41B and 41A' and 41B', respectively, in the support plate 3, the receptors for each pair being located at opposing ends of the cross-shaped arrangement of building platform holes 33. It is noted that the additive manufacturing can be done with multiple laser beams used simultaneously and each pair of receptors is associated to one of the laser scanner coordinate systems.

FIG. 3 shows a schematic perspective cut-view of a portion of the support plate 31 along a cutting plane C, viewed at in a direction C1 as indicated in FIG. 2.

The building platform holes 33 extend through the support plate 31 from the upper surface 31A to a lower surface 31A' opposing the upper surface 31A. An upper section 33U of the respective building platform hole 33 (adjacent to the upper surface 31A) has a larger cross-section than a lower section 33L (adjacent to the lower surface 31A'), forming a hole shoulder 33S in the transition. Furthermore, a slot 33A, e.g., an elongated recess/half channel, is formed in the upper section 33U such that there is an outward notch created at the opening of the building platform hole 33 in the surface 31A. The channel may reach, e.g., down to the lower section 33L.

The upper section 33U of the building platform hole 33 is configured to receive a building platform holder 35. FIG. 3 shows exemplary one cylinder-shaped building platform holder 35 inserted into one of the building platform holes 33.

The building platform holder 35 has a key 35A that can interlock with a respective slot 33A of the respective building platform hole 33, when the building platform holder 35 is inserted into the building platform hole 33. The building platform holder 35 is inserted until it is in contact with the hole shoulder 33S. The interlocking of the key 35A of the respective building platform holder 35 leads to a rotationally and the shoulder to a translationally fixed position of the building platform holder 35 in the building platform hole 33.

The lower section of the building platform hole 33 can be used to push out an inserted building platform holder 35 and remove the same from the building platform hole 33. Thereby. the exchange of the building platform holders 33 and hence the use of different types of building platform holders 33 (e.g., with different geometries for different applications from suppliers) is made possible.

The building platform holder 35 has, for example, a hexagonal recess 35B in which a protruding hexagonal section 37B of a building platform 37 can be inserted (see FIG. 3). When the building platform 37 is inserted in the building platform holder 35, the building platform 37 extends beyond/above the surface 31A.

Furthermore, when the building platform 37 is inserted in the building platform holder 35, the building platform 37 is arranged in a predefined position in relation to the building platform holder 35. Specifically, the hexagonal recess 35B and the hexagonal section 37B interlock with respect to each other, leading to a rotationally and translationally fixed position of the building platform 37 with respect to the building platform holder 35. In this manner the building platform 37 can be provided at the support plate 37 in a rotationally and translationally fixed manner. In consequence (and due to the predefined position of the building platform 37 with respect to the building platform holder 35), knowing the position of the building platform holder 35 with respect to the support plate and knowing the position of the support plate with respect to the scanner's coordinate system allows correctly guiding the laser to manufacture a part precisely on the building platform 37.

Referring to FIG. 3, the building platform 37 can be used as a prefabricated lower part, on which a three-dimensional upper part made of powder can be build using additive manufacturing. The resulting (hybrid) component consists of the lower part (building platform) and the upper part which is fixed to the lower part. Due to the high precision achievable, the herein disclosed teaching can be used in medical and in particular dental applications. In dental applications, the building platform 37 can, for example, be a so-called pre-formed T-base or a modified T-base, on which a dental prosthesis (e.g., a dental crown or a custom abutment) can be built of powder using additive manufacturing with the laser beam 7. By building the dental prosthesis directly on the (modified) T-base, the cohesion between the (modified) T-base and the dental prosthesis can be improved, the degree of freedom for the design of the dental prosthesis can be increased, and/or the use of glue and cement (to fix the dental prosthesis on the T-base) may be avoided.

A plurality of building platforms 37 can be inserted in the support plate 31 at the same time using the plurality of the building platform holes 33.

Returning to the herein disclosed concepts of aligning the support plate with the laser coordinate system, the receptors 41A, 41B, 41A' and 41B' are respectively configured to receive a laser target part 43. The receptors 41A, 41B, 41A' and 41B' open into the surface 31A. For example, a receptor can extend through the support plate 31 from the upper surface 31A to the lower surface 31A', similar to the building platform holes 33. An upper section 41U of the receptor has cross-section bigger than a lower section 41 L of the receptor, forming a receptor shoulder 41S at the transition. A received laser target part 43 can be positioned on the shoulder 41S. Via the lower section 41L, an inserted laser target part 43 can be pushed out of the receiver 41. This also enables the exchange of laser target parts 43 and, thereby, allows a multi-use of the support plate 31.

The method to determine—within the coordinate system X, Y, Z of the scanner optics 25—a position data of a specific one of one or more building platforms 37 added to the support plate 31 involves the additive manufacturing device 1, and precise image data as it can be acquired with the vision measuring device 2. For the sake of simplicity, the following explanations are given involving only one building platform. However, it will be understood by the skilled person that it is also possible (and even recommended to increase the efficiency of the overall manufacturing process) to use the same method for a plurality of building platforms installed together in a common support plate.

Figure 4A:
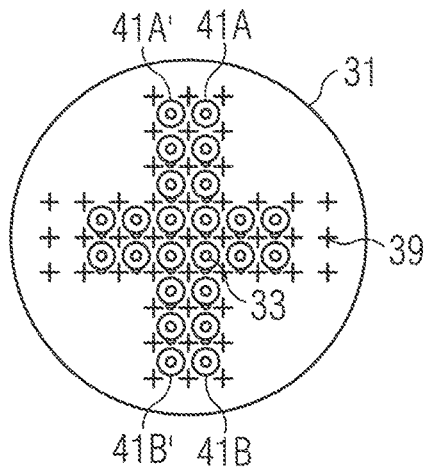
FIG. 4A, FIG. 4B, and FIG. 4C are schematic top views of an exemplary support plate relating to different phases of a procedure to determine a position of a building platform.
Figure 4B:
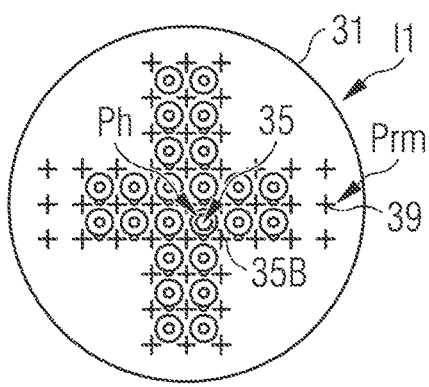
Figure 4C:
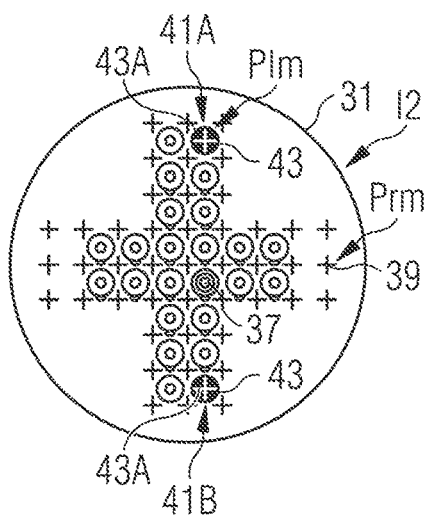

Referring to the schematic top views shown in FIGS. 4A to 4C, a building platform holder 35 has to be inserted into a building platform hole 33 of a support plate 31 by an operator. FIG. 4A shows an "empty" support plate 31 without any building platform holder 35 and no laser target parts 41 inserted. FIG. 4B shows the very same support plate 31, but with one building platform holder 35 inserted in a central platform holder hole, which can be spotted easy in the top-view of FIG. 4B via the hexagonally shaped recess 35B.

The support plate 31 with the inserted building platform holder 35 is then subject to an optical measurement in the vision measuring device 2. The vision measuring device 2 takes a precision image of the support plate 31. FIG. 4B can be considered a precision image referred to I1. The precision image I1 is used, e.g., by the vision controller 65, to measure (determine) a precision position Ph of the inserted building platform holder 35 with respect to the reference marks 9. The precision position Ph may have an accuracy of 5µm and less, such as +/−1.5 µm and less.

As an output of the measurement, there is a first position dataset including the precision position Ph of the building platform holder 35, i.e., relative positions between the building platform holder 35 and two or more of the reference marks Prm.

The first position dataset is sent to and thereby obtained by the controller 19 of the additive manufacturing device 1. In general, it also would be possible that the first position dataset is derived by a third party, e.g., the supplier of a support plate having preinstalled therein a plurality of (identical or different) holders, and made available to the operator/the additive manufacturing device 1 via an external storage device 91. Concerning the first position dataset it is noted that the precise precision position Ph of the building platform and the precise positions of the reference marks Prm are only given relative to each other.

For the additive manufacturing, the operator inserts a building platform 37 in the building platform holder 35 (which itself was inserted in the support plate 31 and for which the precision measurement was performed). The operator also inserts laser target parts 43 in one of the two pairs of receptors 41A, 41B (assuming only one laser beam is scanned). The operator mounts the support plate 31 on the piston 15 in the process chamber 3 of the additive manufacturing device 1.

Suitable means can be used to prevent any movement of the support plate 31 during operation, if needed, e.g., to avoid any rotation relative to the piston 15 and thus the scanner optics 5. FIG. 1 illustrates schematically an engaging of mounting structures 31B provided on the lower surface 31A' of the support plate 31 with corresponding mounting receivers 15B provided on the piston 15. The mounting structure 31B and the corresponding mounting receiver 15B allow for arranging the support plate 31 in a predefined position. However, the precision of that predefined position is insufficient for quality manufacturing of small parts on a platform because the accuracy of the mounting may be much larger than the desired accuracy (in the range of 50 µm or less). In other words, the "mechanic" fixing of the support plate 31 on the piston 15 goes typically along with a translational and rotational inaccuracy of several tenths of a millimeter.

The additive manufacturing device 1 is then brought into an operational state.

Bringing the additive manufacturing device 1 into an operational state, may be accompanied by preheating the environment within the process chamber (preheating phase) to a predetermined temperature level. The preheating may increase the mechanic fixing inaccuracy. If the environment within the process chamber is to be preheated, the following steps are preferably done once the environment within the process chamber essentially reached the predetermined temperature level.

For the next steps, the piston 15 is positioned in an alignment position in which a surface 43B of the laser target parts 43 is aligned with the working plane 9A in Z-direction of the coordinate system X, Y, Z of the scanner optics 5. This procedure is often referred to as "layer-zero positioning".

Then, e.g., cross-shaped laser marks 43A are marked on the laser target parts 43 using the laser beam 7 and the scanner optics 5 (see also FIG. 1). The laser target parts 43 are marked at respective laser mark positions Plm defined in the coordinate system X, Y, Z of the scanner optics 5.

The positions of the laser marks can be set in different ways. One option is to determine the positions by letting the operator manually "target" at the laser target parts 43 with a guiding laser beam.

Another option is to use a support plate and laser target parts with predefined and known geometries/positions and mount the support plate in a predefined, known position on the piston 15 (e.g., through engaging the mounting structure 31B with the corresponding mounting receiver 15B) to enable a pre-given position of the laser target parts 43 prior creating the laser mark positions Plm.

At this stage, there are given the relative positions between the building platform holder 35 and two or more of the reference marks Prm for the support plate 31, e.g., in the first position dataset. As the inserted building platform 37 is in a predefined position with respect to the building platform holder 35 and covers the building platform holder 35, the building platform holder 35 can no longer (or only partly) be seen/detected, it may no longer be usable for measurements at this stage. However, the reference marks 39 are still viewable. Additionally, the freshly written cross-shaped laser marks 43A can be seen.

Thus, a pre-manufacturing image I2 (see FIG. 4C) of the support plate 31 mounted within the process chamber 3 can be acquired with the monitoring camera 11. Usually, a monitoring camera used within the process chamber acquires a pre-manufacturing image that may resolve the surface of the support plate 31 with a resolution in the range of about 200 dpi (dots per inch), such as, e.g., 220 dpi. This translates into a dot (pixel) extension in the range of about 100 µm. For example, for a resolution of 220 dpi, one dot (pixel) represents an area of the surface of the support plate of approx. 115 µm×115 µm (pixel resolution). This resolution may not be sufficient for determining the position of a building platform with the required accuracy for special applications (e.g., dental applications) as that may be in the range of +/−50 µm. Using an image analysis algorithm on the pre-manufacturing image, the positions of the (cross-shaped) reference marks and laser marks can be determined with an increased accuracy that goes beyond the pixel resolution, e.g., deriving a final resolution of approx. 1/10 of the pixel extension. For example, an accuracy of approx. 10 µm to 15 µm (final resolution) can be achieved, e.g., by considering information concerning a (known) shape of an individual reference mark/laser mark, a (known) arrangement, or (known) distances between the reference marks/laser marks within the image analysis algorithm. For example, based on the pre-manufacturing image, an accuracy range from, e.g., 15 µm to 5 µm, or 15 µm to 10 µm may be possible). The controller 19 receives the corresponding image data and obtains from the pre-manufacturing image I2 a second position dataset including positions Prm of the reference marks 39 with respect to the laser marks 43A. As in the first position dataset, also in the second position dataset the position Prm of the reference marks 39 and the position Plm of the laser marks 43A is given relative to each other, but the position of the laser marks 43A is known in the scanner coordinate system X, Y, Z. The accuracy of the position determination benefits from the fact that only visually easily recognizable, cross-shaped reference marks and laser marks are imaged with the monitoring camera 11 such that a sufficient accuracy is given for the image analyses.

Based on the first position dataset and the second position dataset, the controller 19 creates a consolidated position dataset including positions of the building platform holder 35 (and optionally positions of the reference marks 39) with respect to the laser marks 43A. On the pre-manufacturing image I2, the controller 19 may apply a non-linear distortion correction based on neural networks, thin plate splines, or radial basis functions.

The creation of the consolidated position dataset is based on the recognition that the reference marks can be "measured" twice to acquire position information:

For the first time, when the support plate is outside the process chamber by using an (external) vision measuring device. A derived first position data set defines the position of the reference marks (and of any inserted building platform holder) in a size unit (e.g., specifying the position in millimeter, i.e. in mm coordinates).

For the second time, when the support plate is mounted in the process chamber by using the monitoring camera. A derived second position data set defines the position of the reference marks (and of laser marks) based on the pixel resolution of the monitoring camera (e.g., specifying the position in a "pixel unit", i.e. in pixel coordinates).

Using the acquired position information, one can, for example, map the pixel coordinates to the mm coordinates for creating the consolidated position dataset. Specifically, the position of the reference marks (acquired in the first and second measurement) can be laid on-top of each other ("mapped"), thereby providing relative positions between the laser marks (acquired in the second measurement) and the building platform holder (precisely known from the first measurement).

Based thereon and knowing the predefined position of the inserted building platform with respect to the building platform holder, the position data of the building platform can be determined for the manufacturing process.

By computing, e.g., using neural networks, or thin plate spline, or any other type of radial basis functions, the mapping may include a correction of image errors, such as non-linear distortion introduced by any optics, the measurement system, or any preheating/thermal extension.

The above procedure allows also for consideration of a possible thermal expansion of the support plate 31, which can occur when the precision image I1 and the pre-manufacturing image I2 are taken at different temperature levels. Again, it is noted that for the consolidated position dataset, the positions of the reference marks 39 and the position of the building platform holder 35 can be given relatively with respect to the laser marks 43A.

Returning to the exemplary embodiment: From the consolidated position dataset including the (relative) position of the building platform holder 35 (and optionally the (relative) positions of the reference marks 39) with respect to the laser marks 43A and the laser mark positions Plm within the coordinate system X, Y, Z of the scanner optics 5, the controller 10 can determine the position of the building platform holder 35 within the coordinate system X, Y, Z of the scanner optics 5. Given the predefined position of the building platform 37 in relation to the building platform holder 35, the controller 19 can further determine the position data of the building platform 37 within the coordinate system X, Y, Z of the scanner optics 5. Specifically, the controller 19 can transform and project the scanning trajectories, which are defined for the additive manufacturing of a workpiece, onto the final position of the building platform 37.

Afterwards, the (layer-by-layer) build-up of an upper part made of powder using additive manufacturing can be performed on the building platform 37. Due to the high accuracy of the determination of the building platform position, a hybrid component with a very strong bonding between the building platform 37 (lower part) and the upper part can be precisely manufactured. The disclosed procedures open up new areas of application for the additive production of hybrid components, making it possible to benefit also in those areas from the advantages that the additive manufacturing technology has over cutting manufacturing processes (less waste of material, less design limitations, etc.).

The disclosed method further enables the precise determination of the position data of the building platform without laser marking the building platform itself, thus keeping it available for further manufacturing jobs. This has the advantage that process costs can be reduced by making the building platform reusable (instead of disposable). Furthermore, the building platform may be protected against the possibility of material distortion due to the heat input of a laser marking.

After the manufacturing of the workpiece is completed, the hybrid component can be removed from the support plate 31.

To prepare the support plate 31 for the next cycle of the manufacturing process, the operator can push out the used laser target marks 43 and eventually insert new building platform holders 35, e.g., if a different type of building platform holder 35 is to be used or powder leftovers would endanger the precise inserting of the lower part of the platform.

If the additive manufacturing device 1 enables multiple beam processing and, e.g., includes a second scanner optics with a second coordinate system for scanning a second laser beam across the working plane, also the position data of the building platform 37 with respect to the second coordinate system of the second scanner optics needs to be determined at the required accuracy. This can be achieved by the second pair of receptors 41A', 41B'. They can be used for marking additionally laser target parts 43, which are inserted in the second pair of the receptors 41A', 41B'. The second laser marks at second laser mark positions within the second coordinate system of the second scanner optics can be used in an analogous application of the method described above.

The method for determining the position data of a building platform 37 within the coordinate system X, Y, Z of the scanner optics 5 can include the following steps indicated in the flowchart 200 shown in FIG. 5. In square brackets, further exemplary information is added for the steps. It is noted that the steps may at least partially be implemented as a computer-implemented alignment procedure:

In step 210, the first position dataset is obtained. The first position dataset includes the precision position Ph of the one building platform holder 35 inserted in one of the plurality of building platform holes 33 with respect to the reference marks 39.

For example: The building platform holder 35 may be circular in shape and its position may be given by the center of the circular circumference. The reference marks 39 may be formed by orthogonally crossing lines having a length of several millimeters. Their respective positions may be given by the crossing point of the lines. For example, the lines may be formed by structural ridges or coloring. A circumference of a sufficient diameter and lines of sufficient length enable high accuracies, when determining the precision position Ph of the building platform holder 35 with, e.g., at least two or three reference marks. The first position dataset includes data/information (at least in two dimensions) of the positions of the building platform holder 35 and the reference marks 39. The first position data set may include size information generated by a calibrated vision measurement.

For the support plate 31 with the building platform 37 inserted into the building platform holder 35, a laser mark 43A is marked on laser target parts 43 provided in the receptors 41 in step 220. For the marking, the laser beam 7 and the scanner optics 5 are used and the laser marks 43A are marked in the working plane 9A at respective laser mark positions Plm defined in the coordinate system X, Y, Z of the scanner optics.

For example: At least two laser marks 43A may be written onto the laser target parts by moving the laser beam along orthogonally crossing lines having a length of several millimeters. Crossing points of the laser written lines may define their respective positions. The positions are known in the coordinate system used for controlling the scanning of the laser beam.

In step 230, the pre-manufacturing image of the support plate 31 mounted within the process chamber 3 is taken.

For example: The image acquisition may be performed in the visual spectrum by a monitoring camera specifically provided for this purpose or a camera used also for other monitoring purposes. To avoid disturbances of laser radiation, filters may be applied and/or all laser radiation may be interrupted. The camera may be calibrated with respect to the working plane, such that, for example, a preset number of pixels of the pre-manufacturing image correspond to a preset distance in the working plane.

In step 240, the second position dataset including positions Prm of the reference marks 39 with respect to the laser marks 43A is obtained from the pre-manufacturing image.

Due to the shape and/or appearance of the laser marks 43A and the reference marks 39, an image analysis can be performed to identify their associated positions in the image. The second position dataset includes data/information (at least in two dimensions) of the positions of the laser marks 43A and the reference marks 39. The second position data set may include size information generated by a calibrated vision measurement.

In step 250, the position data of the building platform 37 within the coordinate system X, Y, Z of the scanner optics 5 is determined from the first position dataset, the second position dataset, and the (at least two) laser mark positions.

A sufficient distance of the (at least two) laser mark positions can be ensured by positioning the same at opposite sides of the support plate. The (at least two) laser mark positions allow calibrating the scanning movement of the laser beam between those positions. The data/information of the positions of the building platform holder 35, the reference marks 39, and the positions of the laser marks 43A provided in the first position dataset and the second position dataset can be used to link the scanning movement with the position of the building platform holder 35, even without being visible in the pre-manufacturing image. Thus, the building platform can be approached at a high precision.

FIG. 6 illustrates that the step 220 of marking the laser marks 43A on the laser target parts 43 can include, for example, the following steps, the steps may at least partially be implemented as a computer-implemented marking procedure:

In step 222, the support plate 31 is mounted on the movable piston 15 of the additive manufacturing device 1. In step 224, the piston 15 is positioned to align the surface 43B of the laser target parts 43 with the working plane 9. In step 226, the laser beam 7 irradiates the laser target parts 43, e.g., to form the cross-shaped mark on the surface of the laser target parts 43.

FIG. 7 illustrates that the step 250 of determining the position data of the building platform 37 can include the following steps, the steps may at least partially be implemented as a computer-implemented image analysis method:

In step 252, the consolidated position dataset is created to include the positions of the reference marks 39 and the position of the building platform holder 35 with respect to the laser marks 43A based on the first position dataset and the second position dataset.

In step 254, the position data of the building platform 37 is derived within the coordinate system X, Y, Z of the scanner optics 5 from the consolidated position dataset and the laser mark positions.

Finally, examples of additive manufacturing machines in which the herein disclosed concepts can be applied include selective laser sintering or selective laser melting machines such as the "mysint 100", "mysint 200", "mysint 300", "TruPrint 1000", "TruPrint 2000", "TruPrint 3000", and "TruPrint 5000" manufactured by TRUMPF SISMA and/or TRUMPF. The manufacturing of metal or ceramic based elements in line with the herein disclosed concepts may find applications in various technical fields such as in medical, dental, aerospace, and automobile applications.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Although the preferred exemplary embodiments of this invention have been described herein, improvements and modifications may be incorporated without departing from the scope of the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF ELEMENTS additive manufacturing device 1
process chamber 3
scanner optics 5
laser beam 7
powder bed 9
working plane 9A
camera 11
optical window 13
piston 15
relocation axis 15A
mounting receiver 15B
depositing device 17
controller 19
support plate 31
upper surface 31A of the support plate 31
lower surface 31A'
mounting structure 31B of the support plate 31
building platform holes 33
slot 33A
hole shoulder 33S
upper section 33U
lower section 33L
building platform holder 35
key 35A
hexagonal recess 35B
building platform 37
insertion axis 37A
reference mark 39
row 39A
columns 39B
receptor 41A, 41B, 41a', 41B'
laser target part 43
laser mark 43A
vision measuring device 2
precision camera 63
vision controller 65
microprocessor 65A
storage device 65B
system 81
external storage device 91
flow chart 200
steps 210, . . .

The invention claimed is:

1. A method for determining a position data of a building platform provided at a support plate within a process chamber of an additive manufacturing device, the additive manufacturing device comprising scanner optics for scanning a laser beam across a working plane over a powder bed for additive manufacturing of a workpiece, wherein the position data of the building platform relates to a coordinate system of the scanner optics, and the support plate comprising:

a plurality of building platform holes configured to respectively receive at least one building platform holder for holding the building platform,
a plurality of optically detectable reference marks distributed on a surface of the support plate in reference to the building platform holes, and
at least two receptors configured to receive respectively one of laser target parts, the method comprising:
obtaining a first position dataset comprising a precision position of the at least one building platform holder inserted in one of the plurality of building platform holes with respect to the reference marks;
upon the support plate being mounted in the process chamber and the building platform is inserted into the at least one building platform holder, marking a laser mark on the laser target parts provided in the receptors using the laser beam and the scanner optics, wherein the laser marks are marked in the working plane at respective laser mark positions defined in the coordinate system of the scanner optics;
acquiring a pre-manufacturing image of the support plate that has the laser marks on the laser target parts and is mounted within the process chamber;
obtaining from the pre-manufacturing image a second position dataset comprising positions of the reference marks with respect to the laser marks; and
determining the position data of the building platform within the coordinate system of the scanner optics from the first position dataset, the second position dataset, and the laser mark positions.

2. The method of claim 1, wherein the obtaining of the first position dataset comprises taking a precision image of the support plate with the at least one building platform holder inserted in one of the plurality of building platform holes, or receiving the precision image of the support plate with the at least one building platform holder inserted in one of the plurality of building platform holes.

3. The method of claim 2, wherein the precision image is taken with a vision measuring device and the precision position of the at least one building platform holder inserted in one of the plurality of building platform holes with respect to the reference marks is measured with an accuracy of 5 μm or less.

4. The method of claim 1, wherein the marking of the laser marks on the laser target parts comprises:
arranging the support plate on a movable piston of the additive manufacturing device;
positioning the piston to align a surface of the laser target parts with the working plane; and
irradiating the laser beam onto the laser target parts.

5. The method of claim 1, wherein the determining of the position data of the building platform within the coordinate system of the scanner optics comprises:
based on the first position dataset and the second position dataset, creating a consolidated position dataset comprising a position of the at least one building platform holder with respect to the laser marks; and
deriving the position data of the building platform within the coordinate system of the scanner optics from the consolidated position dataset and the laser mark positions.

6. The method of claim 5, wherein the consolidated position dataset is created by mapping the first position dataset and the second position dataset based on the positions given for the reference marks in each of the first position dataset and the second position dataset.

7. The method of claim 1, wherein the laser marks are marked in cross-shaped or the reference marks are cross-shaped.

8. The method of claim 1, the method further comprising:
providing of the laser mark positions defined in the coordinate system of the scanner optics, which comprises:
targeting the laser target parts with a guiding laser beam; or
arranging the support plate on the piston in a predefined position, by engaging a mounting structure of the support plate with a corresponding mounting receiver of the piston.

9. The method of claim 1, wherein the pre-manufacturing image of the mounted support plate is acquired with a monitoring camera of the additive manufacturing device.

10. The method of claim 5, wherein the consolidated position dataset comprises the position of the at least one building platform holder, and positions of the reference marks, with respect to the laser marks.

11. The method of claim 6, wherein the consolidated position dataset comprises applying a non-linear distortion correction using the positions of the reference marks using computations based on neural networks, thin plate splines, or radial basis functions.

* * * * *